United States Patent Office 3,201,475
Patented Aug. 17, 1965

3,201,475
BISGLYOXALYLDIPHENYL DERIVATIVES
Guido Cavallini and Elena Massarani, Milan, Italy, assignors to Francesco Vismara S.p.A., Como, Italy, a firm
No Drawing. Filed July 11, 1960, Ser. No. 41,765
Claims priority, application Italy, Mar. 15, 1960, 4,536/60
8 Claims. (Cl. 260—592)

This application is a continuation-in-part of applicants' abandoned application Serial No. 829,531, filed July 27, 1959.

This invention relates to new bisglyoxalyl compounds and more particularly to bisglyoxalyldiphenyl compounds and functional derivatives thereof, namely the hydrates, alcoholates and alkali metal bisulfite addition compounds.

These compounds are chemotherapeutically active for instance variously as antiviral agents against such viral organisms as hepatitis viruses ($MHV_3$ and $DE_2$), canine distemper, Newcastle disease, influenza virus, Herpes virus, adenovirus, etc. The compounds find use as prophylactic or preventive agents against viral infections in animal organisms. Coupled with the antiviral activity in these compounds is a low order of toxicity to the host organism.

More specifically, the compounds of this invention are represented by the following basic structural formula:

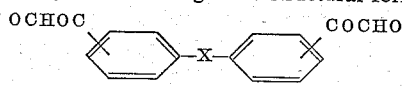

in which X is oxygen, sulfur, sulfonyl ($SO_2$), sulfinyl (SO), methylene ($CH_2$), ethylene (—$CH_2CH_2$—), vinylene (CH=CH) or a single valence bond. The para or 4,4'-bisglyoxalyl congeners are advantageous. The preferred parent compound is that in which X is a single bond. Also included in this invention are the molecular addition products of these parent bisglyoxals, such as the hydrate, alcoholate or alkali metal bisulfite addition products. The hydrates are the preferred addition products.

The hydrates and alcoholate derivatives are represented by the following formula:

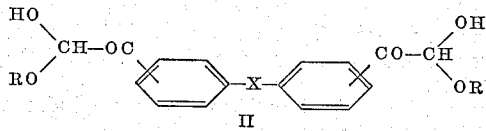

in which R is hydrogen or a hydrocarbon radical containing from 1 to 12 carbon atoms inclusive. Advantageous "lower hydrocarbon radicals" are those having straight or lower branched, saturated or unsaturated alkyl moieties of 1 to 8 carbon atoms inclusive or benzyl.

The dialkali metal bisulfite addition compounds, preferably those derived from nontoxic pharmacologically acceptable alkali metals, such as sodium or potassium bisulfite, are useful for the same purposes as the parent compounds and in addition these derivatives are useful for stabilizing the parent 4,4'-diphenylylbisglyoxal.

The important antiviral activity of the compounds of this invention is shown in Table I which summarizes the results of pharmacological testing on hepatitis virus ($MHV_3$) with a representative compound. The experimental data indicate the number of survivors among the treated animals. Mice were used for each experiment reported in the table. The animals were inoculated by subcutaneous route with a lethal dose of the standard seed virus. Twenty-four hours prior to or after the inoculation a batch of animals was given the compound to be tested, either per os or by nasal route or by intraperitoneal injection, at a dose far below the maximum tolerated one. The remaining animals were kept as controls. After ten days' treatment the animals were maintained under observation for a month. The number of the survivors is an indication of the activity of the tested compound against hepatitis virus.

TABLE I

| Test Compound | Virus $MHV_3$ | | |
|---|---|---|---|
| | Dose, mg./kg. | Route Administration | Number of Survivors, Percent |
| 4,4'-OHCCOC₆H₄C₆H₄COCHO.2H₂O | 75 | s.c. | 80 |
| | 426 | Nasal | 75 |
| | 426 | P.o. | 70 |
| 4,4'-OHCCOC₆H₄C₆H₄COCHO.2C₂H₅OH | 85 | P.o. | 90 |
| 4,4'-OHCCOC₆H₄C₆H₄COCHO.2NaHSO₃ | 237 | s.c. | 66 |

The compounds have proved to be active in the host animal organism in all the forms of administration, that is, by subcutaneous, oral and nasal route. Antiviral activity is exerted whether the drugs are administered prior to or after the onset of the treatment. Therefore the new bisglyoxal derivatives of this invention are suitable for chemoprophylaxis as well as for chemotherapy of hepatitis viral infections in animal organisms.

The method of treating or preventing viral hepatitis in animal organisms using the compounds of this invention consists in administering these compounds internally in an amount sufficient to reduce the infection. The compounds can be formulated for administration in any suitable manner but are preferably administered in association with a suitable nontoxic pharmaceutical carrier which may be liquid or solid depending on the desired route of administration, for example whether the composition is to be administered orally for example as tablets, capsules, troches, suspensions or equivalent dose forms or parenterally in sterile liquid solution and suspensions.

The 4,4'-diphenylylbisglyoxals of this invention may be conveniently prepared by oxidation of the corresponding 4,4'-diacetyldiphenyl derivative which in its turn is prepared from biphenylyl with acetyl chloride and aluminum chloride, according to Long and Henze (J. Am. Chem. Soc., 63; 1939, 1941).

Oxidation of the 4,4'-diacetyldiphenyl derivative may be advantageously carried out with selenium dioxide in an inert organic solvent such dioxane, tetrahydrofuran, acetone, alcohol, hexane, benzene and the like. While the theoretical amount of selenium dioxide is two moles for one mole of 4,4'-diacetyldiphenyl, it is preferred to employ an excess of oxidizing agent, for example from about three to about seven moles. The temperature at which the reaction mixture is heated should be between about 30 and 130° C. conveniently at the boiling temperature of the organic solvent used. Temperatures lower than the boiling temperature can be used if adequate mixing of the reaction mixture is provided. The reaction mixture is heated for a period ranging from 30 minutes to 20 hours. Preferably the reaction time is from about 1 to 10 hours at temperatures from about 50 to 100° C.

If the oxidation is carried out in essentially anhydrous conditions the 4,4'-diphenylylbisglyoxal derivative in an anhydrous state is obtained. The dihydrate or di-alcoholate addition compounds thereof are obtained by reacting the anhydrous glyoxal with water or an alcohol, usually at room or slightly elevated temperature, such as up to about 100° C. for from periods of about 10 minutes to about 10 hours. Alternatively, 4,4'-diphenylylglyoxal dihydrate can be directly obtained from 4,4'-diacetylbiphenyl, carrying out the oxidative reaction with selenium dioxide in nonanhydrous conditions, for example in dioxane solution.

The dialcoholates are in general obtained by reacting the glyoxal, anhydrous or hydrate, with an alcohol under anhydrous conditions, usually in an excess of the desired alcohol with gentle heating at about 60° C. The glyoxal gradually goes into solution. Cooling separates the desired dialcoholate addition product.

Alternatively, the crystalline hydrate can be heated in an excess of alcohol in an anhydrous state with removal of the water formed via azeotropic distillation, eventually by means of a solvent such as benzene, xylene or toluene to give the desired dialcoholate.

The disodium or potassium bisulfite addition compounds are obtained by the reaction of the bisglyoxal, anhydrous or hydrate, with an approximately bimolar equivalent amount of sodium or potassium bisulfite in aqueous alcohol solution.

Alternatively, the bisglyoxalyldiphenyl compounds of this invention can be obtained by reacting the corresponding bisdihaloacetyldiphenyl congener with an alkali metal alcoholate such as sodium or potassium methylate or ethylate in a suitable solvent, usually anhydrous lower alcohols, to form the acetal derivative of Formula III:

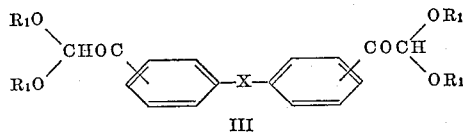

III in which X is as defined hereabove and $R_1$ is lower alkyl of 1 to 4 carbon atoms. The reaction is preferably run at about 40–60° C. for from 1–3 hours and the pH of the reaction mixture must be maintained at about pH 7. The pH of the mixture is followed using phenolphthalein.

The acetal compound is then hydrolyzed with dilute acid such as 3% sulfuric or hydrochloric acid in a suitable solvent such as acetic acid to form the desired bisglyoxalyldiphenyl. This method has proved to be advantageous in giving high yields and generally applicable to compounds not otherwise easily prepared.

The bisdihaloacetyldiphenyl congeners can be prepared by two alternative reactions. The diphenyl parent be acylated using a halogenated acetyl chloride or bromide under standard Friedel-Crafts conditions, such as using aluminum chloride in carbon disulfide to give the desired starting material. Otherwise, the known diacetyldiphenyl compounds are halogenated in a suitable organic solvent nonreactive to halogenation, such as acetic acid, at about 20–60° C. for about 1–6 hours. The dichloroacetyl starting materials are usually isolated by quenching the reaction mixture in a water-ice slurry.

The following examples illustrate the preparation of the novel compounds of this invention as outlined generally hereabove. Other variations of the structures disclosed herein apparent to one skilled in the art are included in this invention, such as the compounds in which X represents the ethylene or vinylene moieties which are substituted with methyl or ethyl groups.

Example 1

A mixture of 6.2 g. of selenium dioxide and 20 cc. of anhydrous dioxane is heated to 60° C. while a solution of 4.8 g. of 4,4'-diacetylbiphenyl in 40 cc. of anhydrous dioxane is added dropwise. The mixture is refluxed for five hours under anhydrous conditions, then filtered hot and partially evaporated. Cooling separates 4,4'-biphenylylbisglyoxal which is characterized as sodium bisulfite addition compound. This product is obtained dissolving 3 g. of biphenylylbisglyoxal in 100 cc. of ethyl alcohol and treating with 200 cc. of a water solution of 6 g. of sodium bisulfite, free from sodium sulfate. After standing overnight at room temperature a crystalline precipitate is obtained which is the desired 4,4'-biphenylylbisglyoxal disodium bisulfite addition compound.

In the same manner the corresponding dipotassium bisulfite addition compound is formed.

Example 2

A mixture of 3.1 g. of selenium dioxide, 2 cc. of water and 8 cc. of dioxane is heated to 70° C. while a solution of 2.4 g. of 4,4'-diacetylbiphenyl in 20 cc. of dioxane is added dropwise. The mixture processed as in Example 1 gives the 4,4'-biphenylybisglyoxal hydrate, M.P. 160–162° C.

Then 8.3 g. of the glyoxal hydrate are treated at 60° C. and under continuous stirring, with 60 cc. of anhydrous ethyl alcohol. When all the product is gone into solution, by cooling a crystalline precipitate is obtained which is filtered and washed with a little cold ethyl alcohol. The 4,4'-biphenylylbisglyoxal diethylate shows melting point 127° C.

Example 3

A mixture of 16 g. of biphenylylbisglyoxal hydrate and 120 cc. of anhydrous methyl alcohol is gently heated at 50° C. with stirring until clear. Cooling separates the dimethylate, M.P. 104–105° C.

In the same manner using the same excess amounts of alcohol are prepared the di-n-propylate, M.P. 130° C.; the diisopropylate, M.P. 125° C.; dibutylate, cytronelylate and allylate derivatives.

Example 4

A solution of 7.3 g. of 4,4'-diacetylbiphenyl in 60 cc. of tetrahydrofuran is added dropwise to a mixture of 11.5 g. of selenium dioxide and 20 cc. of tetrahydrofuran. The reaction mixture is refluxed for several hours, then filtered hot. A small amount of water is added and the desired hydrate of the 4,4'-biphenylylbisglyoxal separates by cooling.

This compound (5.8 g.) is reacted with 45 cc. of n-hexyl alcohol for three hours at 60° C. to give the dihexylate addition product.

Example 5

A mixture of 4 g. of biphenylylbisglyoxal hydrate and 40 cc. of anhydrous benzyl alcohol is heated at reflux for six hours over a water trap (Org. Syn., 3, 382) having an inner funnel charged with a mixture of phosphorus pentoxide and a filter aid. The mother liquid is then partially concentrated in vacuo and cooled to give the desired dibenzylate.

By substituting in the said reaction n-octyl alcohol for benzyl alcohol the corresponding di-n-octylate of 4,4'-biphenylylbisglyoxal is obtained.

Example 6

A mixture of 13 g. of 4,4'-diacetyldiphenylmethane, M.P. 93–94° C., obtained by the Friedel-Crafts reaction using diphenylmethane, acetyl chloride and aluminum chloride, and 200 ml. of hot anhydrous benzene is cooled to 40° C., then treated with chlorine gas to give 4,4'-bisdichloroacetyldiphenylmethane, M.P. 112–113° C.

This compound, 6 g., in 100 ml. of ethyl alcohol is mixed with a solution of 1 g. of sodium metal in 25 ml. of ethyl alcohol. After several hours at 50° C., the reaction mixture is neutral to phenolphthalein. The separated salt is filtered. The solvent is removed in vacuo to leave the ethyl acetal derivative which is hydrolyzed by dissolving; the crude residue in warm acetic acid and treating with 3% sulfuric acid. Water separates the hydrate of 4,4'-bisglyoxalyldiphenylmethane.

A solution of 1 g. of the glyoxal in 150 ml. of ethyl alcohol is treated with a saturated aqueous solution of pure sodium bisulfite. The mixture is diluted with water. After standing overnight the bisulfite addition product is separated.

The bisglyoxal is reacted with O-phenylenediamine to form the quinoxaline derivative, M.P. 214° C.

*Example 7*

A mixture of 13.3 g. of 4,4'-diacetyldiphenylethane and 200 ml. of hot glacial acetic acid at 50° C. is treated with chlorine gas for two hours. The mixture is poured into water and extracted with methylene chloride. The residue from the organic extracts is crude 4,4'-bisdichloroacetyldiphenylethane which is recrystallized from dilute methanol, M.P. 153–154° C.

This material (6 g.) is reacted with sodium methylate in methyl alcohol to form the methyl acetal which is purified then hydrolyzed with 3% hydrochloric acid to give 4,4'-bisglyoxalyldiphenylethane hydrate, M.P. 147–149° C.

The hydrate (1 g.) is heated at 100° C. in a drying pistol to give the free bisglyoxal which (500 mg.) is heated briefly in ethanol to give the ethylate addition product.

*Example 8*

A mixture of 9 g. of stilbene, 20 g. of aluminum chloride and 100 ml. of carbon disulfide is stirred at ambient temperature while 15.1 g. of dichloroacetylchloride is added. The mixture is heated at reflux for one hour then poured into an ice-acid slurry. The chloroform extracts of the quenched mixture are dried and evaporated to give 4,4'-bisdichloroacetylstilbene.

This compound (5 g.) is reacted with potassium ethylate in ethyl alcohol to form the ethyl acetal which is hydrolyzed as described to form the hydrate of 4,4'-bisglyoxalylstilbene, M.P. 202° C. (dec.).

*Example 9*

A mixture of 12.5 g. of 4,4'-diacetyldiphenylether and 100 ml. of glacial acetic acid is chlorinated for two hours. After working up as in Example 8, 4,4'-bisdichloroacetyldiphenylether is obtained. Reaction of this compound (9.5 g.) with sodium ethylate as above gives the desired 4,4'-bisglyoxalyldiphenylether hydrate, M.P. 147–149° C. This hydrated material (2 g.) is heated in a drying pistol at 75° C. to give the free glyoxal. This material (500 mg.) is reacted with propargyl alcohol to form the propargylate addition product.

*Example 10*

A mixture of 8.8 g. of 4,4'-diacetyldiphenylsulfide in 100 ml. of acetic acid is chlorinated with chlorine gas at 40° C. The 4,4'-bisdichloroacetyldiphenylsulfide which is isolated as disclosed above is dissolved in ethanol and reacted with sodium ethylate solution to give the ethyl acetal which is hydrolyzed in dilute acid to give 4,4-bisglyoxalyldiphenylsulfide hydrate, M.P. 135–136° C.

This compound (3 g.) is heated in a drying pistol to give the free glyoxal which (1 g.) is dissolved in butanol with warming to form the butylate addition compound.

*Example 11*

A mixture of 5.6 g. of 4,4'-diacetyldiphenylsulfoxide, prepared by oxidizing the corresponding sulfide with the calculated amount of hydrogen peroxide, is dissolved in 175 ml. of acetic acid, chlorinated and reacted with sodium methylate to form the methyl acetal which is hydrolyzed to give a residue of 4,4'-bisglyoxalyldiphenylsulfoxide. This residue is taken up in ethyl alcohol and reacted with potassium bisulfite as described to give the addition compound.

*Example 12*

A solution of 6 g. of 4,4'-diacetyldiphenylsulfone, prepared by oxidation of the sulfide with an excess of hydrogen peroxide, in 500 ml. of acetic acid is reacted at 30–40° C. with a solution of 12.5 g. of bromine in 20 ml. of acetic acid. After brief stirring, the mixture is quenched in water to give 4,4'-bisdibromoacetyldiphenylsulfone, M.P. 195° C. This compound (6 g.) is dissolved in methyl alcohol and reacted with a solution of sodium methylate in methyl alcohol to give the methyl acetal which is hydrolyzed with 3% hydrochloric acid to give 4,4'-bisglyoxalyldiphenylsulfone hydrate.

*Example 13*

A mixture of 2.4 g. of 3,3'-diacetylbiphenyl (Simpson, J. Chem. Soc., 1945, 646) in 25 ml. of anhydrous dioxane is oxidized with 3.1 g. of selenium dioxide in 15 ml. of dioxane at reflux for six hours. The solution is filtered and evaporated to give, after purification, 3,3'-bisglyoxalylbiphenyl.

*Example 14*

A mixture of 7.5 g. of α,β-diethylstilbene and carbon disulfide is acylated using dichloroacetyl chloride and aluminum chloride as described above to give 4,4'-bisdichloroacetyl-α,β-diethylstilbene. This compound (2.5 g.) is dissolved in methanol, reacted with potassium methylate to form the methylacetal and hydrolyzed as above to give the 4,4'-bisglyoxal derivative as the hydrate.

*Example 15*

A mixture of 5.4 g. of 4,4'-diacetyl-α,β-diethyldiphenylethane is chlorinated to form the bisdichloroacetyl intermediate. This compound (2 g.) is then reacted with sodium ethylate to give the bisglyoxalyl derivative as the ethylate addition product.

*Example 16*

A mixture of 20 g. of 2,2'-diacetyldiphenyl and 400 ml. of glacial acetic acid is prepared and cooled to 50° C. Chlorine gas is bubbled into the mixture for one hour. The mixture is treated with water and extracted with methylene chloride. The combined organic extracts are dried, then evaporated to give 2,2'-bisdichloroacetylbisphenyl.

This compound (8 g.) in 100 ml. of absolute ethyl alcohol is mixed with a solution of 1.2 g. of sodium metal in 25 ml. of ethyl alcohol. After two hours at 60° C., the reaction mixture is neutral to phenolphthalein. The filtered mother liquor is evaporated. The residue is dissolved in acetic acid at 60° C. and treated with 3% hydrochloric acid to separate 2,2'-bisglyoxalylbiphenyl hydrate, M.P. 89–91° C.

What is claimed is:

1. A chemical compound selected from the group consisting of
   (1) a compound of the formula

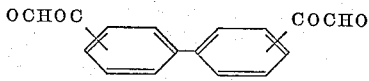

(2) a nontoxic, pharmacologically acceptable alkali metal bisulfite addition compound thereof;
   (3) a compound of the formula

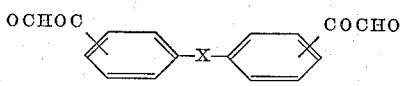

in which X is a member selected from the group consisting of oxygen, sulfur, sulfonyl, sulfinyl, methylene, ethylene and vinylene;
   (4) a nontoxic pharmacologically acceptable alkali metal bisulfite addition compound of said last-named compound;

(5) a compound of the formula

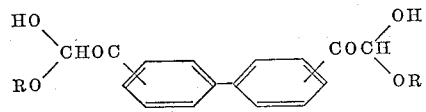

in which R is a member selected from the group consisting of hydrogen and a lower hydrocarbon radical; and (6) a compound of the formula

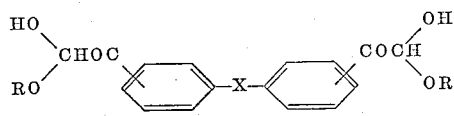

in which X and R have the same meaning given above.

2. A chemical compound selected from the group consisting of
(1) a compound having the formula

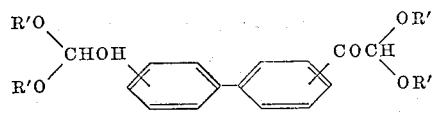

in which R' is a member selected from the group consisting of methyl and ethyl and (2) a compound of the formula

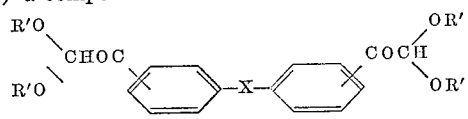

in which X is a member selected from the group consisting of oxygen, sulfur, sulfonyl, sulfinyl, methylene and ethylene and R' has the same meaning given above.

3. A chemical compound having the formula:

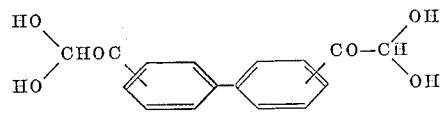

4. 4,4'-bisglyoxalylbiphenyl.
5. 4,4'-bisglyoxalylbisphenyl hydrate.
6. 4,4'-bisglyoxalyldiphenylether hydrate.
7. 4,4'-bisglyoxalyldiphenylsulfide hydrate.
8. 2,2'-bisglyoxalylbiphenyl hydrate.

References Cited by the Examiner

Fieser et al.: Organic Chemistry (2nd ed.), pp. 203–5 (1950).

Musante et al.: Gazz. Chim. Ital., vol. 80, pp. 868 and 875 (1950).

Ruggli et al.: Chem. Abstracts, vol. 33, pp. 6847–9 (1939).

LORRAINE A. WEINBERGER, *Primary Examiner.*

CHARLES B. PARKER, LEON ZITVER, *Examiners.*